United States Patent
Meng et al.

(10) Patent No.: US 11,704,404 B2
(45) Date of Patent: Jul. 18, 2023

(54) METHOD FOR CONTROL-FLOW INTEGRITY PROTECTION, APPARATUS, DEVICE AND STORAGE MEDIUM

(71) Applicant: Institute of Information Engineering, CAS, Beijing (CN)

(72) Inventors: Dan Meng, Beijing (CN); Liwei Chen, Beijing (CN); Jinfeng Li, Beijing (CN); Cairui She, Beijing (CN); Gang Shi, Beijing (CN)

(73) Assignee: Institute of Informational Engineering, CAC, Beijing (CN)

( * ) Notice: Subject to any disclaimer, the term of this patent is extended or adjusted under 35 U.S.C. 154(b) by 73 days.

(21) Appl. No.: 17/361,270

(22) Filed: Jun. 28, 2021

(65) Prior Publication Data
US 2021/0406017 A1    Dec. 30, 2021

(51) Int. Cl.
*G06F 21/52* (2013.01)
*G06F 9/30* (2018.01)

(52) U.S. Cl.
CPC ............ *G06F 21/52* (2013.01); *G06F 9/3005* (2013.01); *G06F 9/30181* (2013.01)

(58) Field of Classification Search
CPC ..... G06F 21/52; G06F 9/3005; G06F 9/30181
See application file for complete search history.

(56) References Cited

U.S. PATENT DOCUMENTS

| | | |
|---|---|---|
| 8,151,349 B1 | 4/2012 | Yee |
| 2005/0010804 A1* | 1/2005 | Bruening ................. G06F 21/52 726/1 |
| 2008/0184016 A1* | 7/2008 | Erlingsson .......... G06F 9/30061 712/E9.001 |
| 2014/0283040 A1* | 9/2014 | Wilkerson ............ G06F 12/145 726/22 |
| 2017/0242778 A1* | 8/2017 | Terras ..................... G06F 21/52 |

FOREIGN PATENT DOCUMENTS

EP    3866037 A2    8/2021

OTHER PUBLICATIONS

Stephen McCamant et al., "Evaluating SFI for a CISC Architecture", Security '06: 15th USENIX Security Symposium, USENIX Association, Aug. 2, 2006, pp. 209-224, XP061011077.

* cited by examiner

*Primary Examiner* — Ashokkumar B Patel
*Assistant Examiner* — William B Jones
(74) *Attorney, Agent, or Firm* — Pokalsky Wilczynski Brozek, LLP

(57) ABSTRACT

Embodiments of the present disclosure provide a method for control-flow integrity protection, including: changing preset bits of all legal target addresses of a current indirect branch instruction in a control flow of a program to be protected to be same; and rewriting preset bits of a current target address of the current indirect branch instruction to be same as the preset bits of the legal target addresses, so that the program to be protected terminates when the current target address is tampered with. By changing the preset bits of all the legal target addresses of the current indirect branch instruction to be same and rewriting the preset bits of the current target address to be consistent with the preset bits of the legal target addresses, traditional label comparison is replaced by the preset bit overlap operation, reducing performance overhead and improving attack defense efficiency.

11 Claims, 4 Drawing Sheets

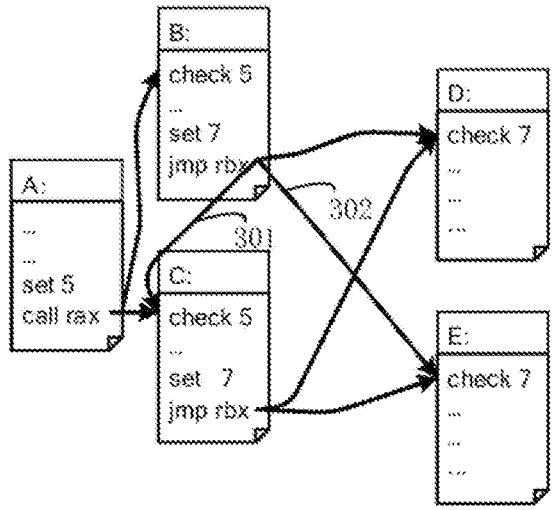

FIG. 3

Changing preset bits of all legal target addresses of a current indirect branch instruction in a control flow of a program to be protected to be same — 400

Rewriting preset bits of a current target address of the current indirect branch instruction to be same as the preset bits of the legal target addresses, so that the program to be protected terminates when the current target address is tampered with — 401

FIG. 4

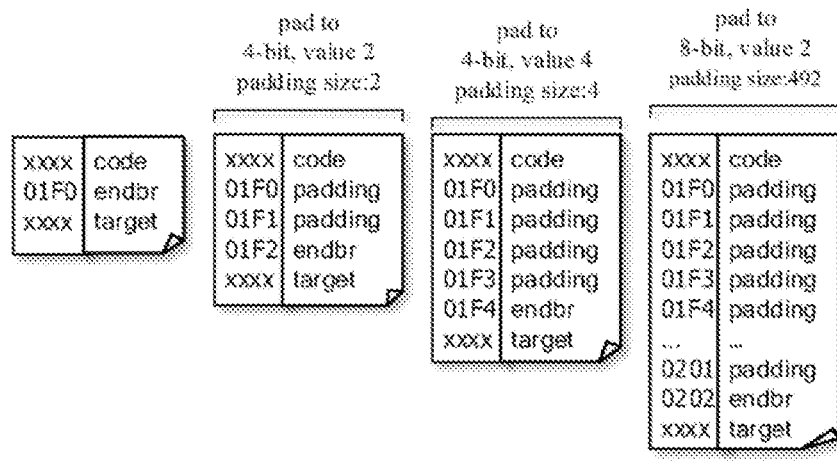

FIG. 5

METHOD FOR CONTROL-FLOW INTEGRITY PROTECTION, APPARATUS, DEVICE AND STORAGE MEDIUM

CROSS-REFERENCE TO RELATED APPLICATIONS

This application claims priority to Chinese Patent Application No. 202010599864.5, filed on Jun. 28, 2020, which is hereby incorporated by reference in its entirety.

TECHNICAL FIELD

The present disclosure relates to the field of communications, in particular to a method for control-flow integrity protection, an apparatus, a device and a storage medium.

BACKGROUND

Because instructions in the Von Neumann structure are stored as data in memory for execution, early attackers would inject malicious codes as data into the memory, and then hijack control flow to execute the injected malicious codes. Current operating systems generally use non-executable bit technologies, that is, with each memory page being marked with readable, writable or executable. Code segments of a program will be marked as executable but non-writable, and data segments will be marked as non-executable. In this way, because an attacker's malicious codes are injected as data into the memory, they are marked as non-executable. When the attacker tries to execute the malicious codes, an error will be reported due to an illegal memory page marking. In order to bypass the non-executable bit protection technologies, researchers proposed a code reuse attack. That is, the code segments of the program itself are used to implement various small functions, and then an indirect branch instruction is used to link the code segments to achieve a complete attack. Because the code segments themselves are the program's own codes and are marked as executable, the non-executable bit protection can be bypassed.

The existing method for control-flow integrity (CFI) protection can effectively prevent a code reuse attack. In the method for control-flow integrity protection, a legal control flow graph of the program is obtained through static or dynamic analysis, and whether the control flow conforms to the control flow graph is checked when the program is running. If the control flow conforms to the control flow graph, it indicates that the program behavior is legal, and if the control flow does not conform to the control flow graph, it indicates that there is an attack behavior. The existing software-based CFI technologies introduce a huge performance overhead. For example, the maximum overhead of the original CFI is 45%. The main reason is the need for comparison operation, which takes a long time. The coarse-grained CFI technology currently applied is generally coarse-grained CFI, which does not make a distinction between the destination addresses of indirect transfer. That still leaves a lot of attack space for the attacker. And hardware implementation cannot achieve security protection for older processors.

Therefore, how to propose a method for control-flow integrity protection that has low performance overhead in use and can still achieve security protection has become an urgent problem to be solved.

SUMMARY

In view of the existing problems, embodiments of the present disclosure provide a method for control-flow integrity protection, an apparatus, a device and a storage medium.

In a first aspect, the method for control-flow integrity protection provided by an embodiment of the present disclosure includes:

changing preset bits of all legal target addresses of a current indirect branch instruction in a control flow of a program to be protected, to make the preset bits of any legal target address of the current indirect branch instruction be same as the preset bits of other legal target addresses of the current indirect branch instruction; and rewriting preset bits of a current target address of the current indirect branch instruction to be same as the preset bits of the legal target addresses, so that the program to be protected terminates when the current target address is tampered with.

Optionally, the rewriting preset bits of a current target address of the current indirect branch instruction to be same as the preset bits of the legal target addresses, so that the program to be protected terminates when the current target address is tampered with, specifically includes:

rewriting the preset bits of the current target address to be same as a label of the current indirect branch instruction, so that a current indirect branch cannot jump to the legal target addresses when the current target address is tampered with, and the program to be protected terminates;

where the label is preset bits of a legal target address of the current indirect branch instruction.

Optionally, the rewriting the preset bits of the current target address to be same as a label of the current indirect branch instruction specifically includes:

performing an operation of instrumenting code at the current indirect branch instruction;

where the code is used to rewrite the preset bits of the current target address to be same as the label.

Optionally, the changing preset bits of all legal target addresses of a current indirect branch instruction in a control flow of a program to be protected, to make the preset bits of any legal target address of the current indirect branch instruction be same as the preset bits of other legal target addresses of the current indirect branch instruction, specifically includes:

performing a null instruction filling operation on all the legal target addresses respectively, so that the preset bits of all the legal target addresses increase until equal to the label of the current indirect branch instruction.

Optionally, the label of the current indirect branch instruction is preset at random, where the label of the current indirect branch instruction is different from labels of other indirect branch instructions in the program to be protected.

Optionally, the preset bits of the legal target addresses are low bytes of the legal target addresses, and the preset bits of the current target address are low bytes of the current target address.

Optionally, before rearranging all legal target addresses of indirect branch instructions in the control flow of the program to be protected, the method further includes:

performing static analysis on the program to be protected to obtain the control flow of the program to be protected.

In a second aspect, an embodiment of the present disclosure provides an apparatus for control flow integrity protection, including:

a changing module, configured to change preset bits of all legal target addresses of a current indirect branch instruction in a control flow of a program to be protected, to make the preset bits of any legal target address of the current indirect branch instruction be same as the preset bits of other legal target addresses of the current indirect branch instruction; and a rewriting module, configured to rewrite preset bits of a current target address of the current indirect branch instruction to be same as the preset bits of the legal target addresses, so that the program to be protected terminates when the current target address is tampered with.

In a third aspect, an embodiment of the present disclosure provides an electronic device, including a memory, a processor, and a computer program stored in the memory and capable of running on the processor. When the processor executes the computer program, the steps of the method for control-flow integrity protection provided in the first aspect are implemented.

In a fourth aspect, an embodiment of the present disclosure provides a non-transitory computer-readable storage medium on which a computer program is stored. When the computer program is executed by a processor, the steps of the method for control flow integrity protection provided in the first aspect are implemented.

In the method for control-flow integrity protection, the apparatus, the device and the storage medium provided by the embodiments of the present disclosure, by changing the preset bits of all the legal target addresses of the current indirect branch instruction to be same and rewriting the preset bits of the current target address of the current indirect branch instruction to be consistent with the preset bits of the legal target addresses, traditional label comparison is replaced by the preset bit coverage operation, which reduces the performance overhead and improves the attack defense efficiency. In addition, the program to be protected is enabled to terminate when the current target address is tampered with, as an error in a target instruction triggers an abnormality, which realizes a fine-grained control-flow integrity protection, and improves the security and reliability of control-flow integrity protection.

BRIEF DESCRIPTION OF DRAWINGS

In order to describe the technical solutions of the embodiments of the present disclosure or the prior art more clearly, the following will briefly introduce the drawings that need to be used in the description of the embodiments or the prior art. Obviously, the drawings in the following description are some embodiments of the present disclosure. For those of ordinary skill in the art, other drawings can be obtained according to these drawings without creative work.

FIG. 3 is a schematic diagram of effects of fine-grained control-flow integrity protection in an embodiment of the present disclosure;

FIG. 4 is a schematic flowchart of a method for control-flow integrity protection provided by an embodiment of the present disclosure;

FIG. 5 is a flowchart of a null instruction filling operation of a legal target address provided by an embodiment of the present disclosure;

DESCRIPTION OF EMBODIMENTS

Figure 1:
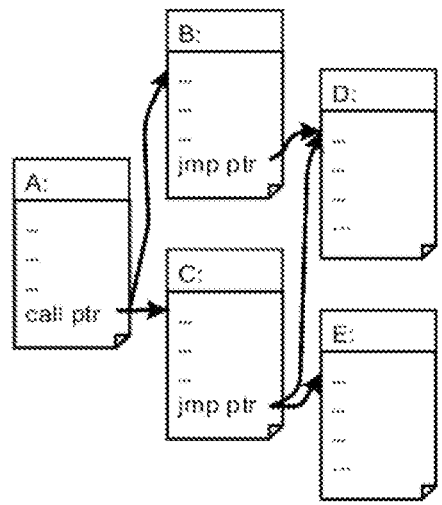
FIG. 1 is a schematic diagram of legal paths in a control flow of a program to be protected in an embodiment of the present disclosure.

In order to make the purposes, technical solutions, and advantages of embodiments of the present disclosure more clear, in the following the technical solutions in the embodiments of the present disclosure will be described clearly and completely in conjunction with the accompanying drawings in the embodiments of the present disclosure. Obviously, the described embodiments are part of the embodiments of the present disclosure, but not all of the embodiments. All other embodiments obtained based on the embodiments of the present disclosure by those of ordinary skill in the art without creative work shall fall within the protection scope of the present disclosure.

Some background knowledge used in each embodiment of the present disclosure is described as follows:

Indirect branch: an indirect branch (also known as a computed jump, indirect jump and register-indirect jump) is a type of program control instruction present in some machine language instruction sets. The address where a next instruction is executed, rather than where the address specified by a parameter is located, is specified in the direct branch. Therefore, an example is "jump on the indirect R1 register", which means that a value of the address where the instruction to be executed in the future is in the register R1. The address to be jumped to is an unknown address until the instruction is executed. An indirect branch can also depend on the value of a memory location.

Memory vulnerability: it refers to a programmer's design errors in time or space in an operation of a memory in the process of software programming, which causes the program to behave in violation of the design of the program itself. An attacker can use the memory vulnerability of the program to construct various attacks and perform malicious actions.

Present operating systems generally use non-executable bit technologies, that is, with each memory page being marked with readable, writable or executable. Code segments of a program will be marked as executable but non-writable, and data segments will be marked as non-executable. In this way, because an attacker's malicious codes are injected as data into the memory, they are marked as non-executable. When the attacker tries to execute the malicious codes, an error will be reported due to an illegal memory page marking.

Code-reuse attack (CRA): it refers to using code segments of a program itself to achieve various small functions, and then using an indirect branch instruction to link the code segments to achieve a complete attack. This type of attack mainly includes ROP attacks and their variants, such as JOP attacks. For example, an attacker can definitely execute an instruction of "jmp RAX", which is an indirect jump instruction. If the attacker can control a value of RAX, he/she can hijack a control flow to jump to an instruction sequence at an arbitrary address. If a next instruction sequence also ends with another indirect branch, then a jump to a sequence at any other address can also be continued in a same way. Each indirect branch can be of a different type or a single type: indirect calls (such as callRAX), indirect jumps (such as jmp RAX), and return instructions (an address pops from the stack and then jump).

Researchers find that control-flow integrity (CFI) can effectively prevent a code reuse attack. In the control-flow integrity protection, a legal control flow graph of the program is obtained through static or dynamic analysis, and whether the control-flow conforms to the control flow graph is checked when the program is running. If the control flow conforms to the control flow graph, it indicates that the program behavior is legal, and if the control flow does not conform to the control flow graph, it indicates that there is an attack behavior.

CFI can be roughly divided into coarse-grained and fine-grained: the fine-grained refers to using marking, for example, a to b, and c to d, for all source and destination addresses of each (indirect) control flow to make a detailed distinction. The coarse-grained generally refers to only marking a code segment that can be used as the destination address for indirect control-flow transfer. If a to b and c to d are legal, b and d are marked as legal destinations, and a to d and c to b are also legal in the coarse-grained CFI. Therefore, it can be seen that the fine-grained CFI is more secure. The coarse-grained CFI is simpler to implement.

FIG. 1 is a schematic diagram of legal paths in a control flow of a program to be protected in an embodiment of the present disclosure. As shown in FIG. 1, the legal paths in the control flow of the program to be protected are A to B, A to C, B to D, C to D, and C to E.

Figure 2:
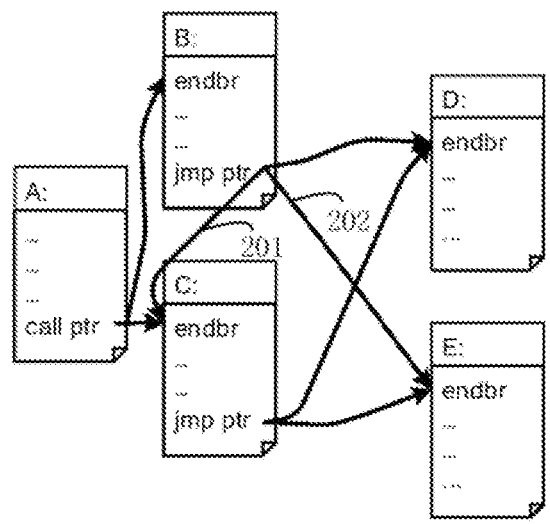
FIG. 2 is a schematic diagram of effects of coarse-grained control-flow integrity protection in an embodiment of the present disclosure.

FIG. 2 is a schematic diagram of effects of coarse-grained control-flow integrity protection in an embodiment of the present disclosure. As shown in FIG. 2, since a coarse-grained method only identifies legal targets, and B, C, D and E in the control flow graph of the program to be protected are all legal targets, when the program is attacked, for example, when the jump path from B is tampered with to be illegal paths 201 or 202, that is, when the target address for B is tampered with to be C or E, the program mistakes the path 201 or the path 202 as legal because the target C or E is legal. That is, s protection is not achieved by such method.

FIG. 3 is a schematic diagram of effects of fine-grained control-flow integrity protection in an embodiment of the present disclosure. As shown in FIG. 3, since each indirect branch instruction has only one position for placing a label, when there are two legal paths starting from C (i.e. C to D, and C to E), D and E can only use a same check 7, which corresponds to set 7 of C, so that a normal jump from C to D and from C to E can be realized, but B to D is also legal, thus B can only use set 7 that matches check 7. When the program is attacked, for example, when a jump path from B is tampered with to be an illegal path 301, the program takes the path 301 as illegal because C uses check 5 that does not correspond to the set 7 of B. That is, the protection is achieved. But if the program is attacked by tampering with the jump path from B to be an illegal path 302, the program mistakes the path 302 as legal because E uses check 7 that corresponds to the set 7 of B. That is, protection is not achieved by such method.

Therefore, it is easy to understand that because an ordinary fine-grained CFI needs a register with a set label and a register with a check label, and can only defend against one of the attacks. However it is easy to see that if there is only a single label in each location, C, D and E need to share the label, and then there will be an attack that cannot be defended. At present, both the LLVM compiler and the GCC compiler support the fine-grained CFI, where basic principles are basically the same as the foregoing.

At present, hardware processor manufacturers are also beginning to apply CFI technologies to protect computer security, such as Intel's CET technology. This technology is a typical coarse-grained CFI, with a same instruction END-BRANCH marking entrances of all legal jump targets. When an indirect transfer occurs, a processor checks whether a destination address of the transfer is the ENDBRANCH instruction. If the destination address is not the END-BRANCH instruction, it is considered that an attack has occurred. ARM's BTI technology possesses design ideas similar to the CET.

The fine-grained CFI technology with low performance overhead is realized based on software, and compared with hardware CFI, it solves the problems of compatibility and insufficient security in the coarse-grained. However, the software-based CFI technology will introduce huge performance overhead, and the CFI technology currently applied is generally coarse-grained CFI, which does not distinguish between the destination addresses of indirect transfers. It still leaves a lot of room for attackers. And hardware implementation cannot achieve security protection for older processors.

Based on the above-mentioned features, in order to overcome the problem that the currently applied CFI technology cannot achieve security protection, the main idea of each embodiment of the present disclosure is to use preset bits of legal target addresses of an indirect branch as a label, which can save an operation of inserting a label before a jump target. It is understandable that the legal target addresses of the indirect branch are the addresses where all legal targets the indirect branch may jump to are. At the same time, low bits of a jump destination address are directly rewritten by using the label, comparison at the indirect branch can be omitted, and the performance can be improved. The fine-grained CFI technology with low performance overhead is realized based on software, and compared with hardware CFI, it can solve the problems of compatibility and insufficient security in the coarse-grained.

The present disclosure will be described in detail below in conjunction with a number of embodiments.

FIG. 4 is a schematic flowchart of a method for control-flow integrity protection provided by an embodiment of the present disclosure, including:

Step 400: changing preset bits of all legal target addresses of a current indirect branch instruction in a control flow of a program to be protected, to make the preset bits of any legal target address of the current indirect branch instruction be same as the preset bits of other legal target addresses of the current indirect branch instruction.

Specifically, the current indirect branch instruction refers to an indirect branch instruction to be executed in the program to be protected; in this embodiment, the preset bits of all legal target addresses of the current indirect branch instruction in the control flow of the program to be protected can be changed to the same. That is, preset bits of an address where a legal jump target corresponding to an indirect branch instruction is located are used as a label, and a code rearrangement mechanism is designed to perform static analysis and rearrangement operation on instructions to make preset bits (labels) of jump target addresses of a same group consistent, which is convenient to check whether the program to be protected is tampered with.

Specifically, if the preset bits are low bits of an address, low bits of an address where a legal jump target corresponding to an indirect branch instruction is located are used as a label, and a code rearrangement mechanism is designed to perform static analysis and rearrangement operation on instructions to make low bits (labels) of jump target addresses of a same group consistent, which is convenient to check whether the program to be protected is tampered with.

Step 401: rewriting preset bits of a current target address of the current indirect branch instruction to be same as the preset bits of the legal target addresses, so that the program to be protected terminates when the current target address is tampered with.

Specifically, in this embodiment, check logic of the traditional CFI at an indirect branch instruction is rewritten. The traditional CFI uses a comparison operation to compare whether a label of a jump target is legal. In this embodiment, preset bits of a legal target address are used as a label, so the current target address can be directly covered by the legal target address. That is, the label is used to directly rewrite the preset bits of the current target address, which saves the comparison at the indirect branch and improves efficiency, and by replacing the traditional label comparison with the preset bit coverage operation, the performance overhead is reduced.

In this embodiment, since the preset bits of the legal target addresses that have been changed to be the same are used as the label, and the label is used to directly rewrite the preset bits of the current target address, if the program is executed normally, due to consistent present bits of the legal target addresses and an address to be currently jumped to, the program is executed normally. However, if the current target address of the indirect branch instruction is tampered with by an attacker, preset bits of the tampered address by the attacker is also rewritten to be consistent with those of the legal target addresses, while other bits are inconsistent with those of the legal target addresses, so a jump to an legal target address is impossible. In addition, because the other bits of the address are consistent with a jump target address to which the attacker wants to construct the attack while the rewritten preset bits are inconsistent with the jump target address to which the attacker wants to construct the attack, a jump to an illegal target address resulting from the tampering by the attacker is also impossible, and thus the program automatically terminates due to an error in a target instruction.

For example, if preset bits of jmp ecx for storing a jump target are low bits of an address, and preset bits 0xAB of the legal target addresses that have been changed to be the same are used as the label, after a destination address in the jmp ecx is tampered with by an attacker, because low bits of the tampered address by the attacker are also rewritten to be 0xAB, a jump to a jump target to which the attacker wants to construct the attack is impossible. At this time, the current target address is not exactly the same as a legal target address, the program terminates as an error in a target instruction automatically triggers an abnormality. Therefore, due to the error in the target instruction, the indirect branch jumps to a wrong current target address, and the jump address is not endbr. Thus the program can take that as an attack occurring. It is understandable that the method provided in this embodiment can defend against all attacks.

In the method for control-flow integrity protection provided by the embodiments of the present disclosure, by changing the preset bits of all the legal target addresses of the current indirect branch instruction to be same and rewriting the preset bits of the current target address of the current indirect branch instruction to be consistent with the preset bits of the legal target addresses, traditional label comparison is replaced by the preset bit coverage operation, which reduces the performance overhead and improves the attack defense efficiency. In addition, the program to be protected is enabled to terminate when the current target address is tampered with, as an error in a target instruction triggers an abnormality, which realizes a fine-grained control-flow integrity protection, and improves the security and reliability of control-flow integrity protection.

Optionally, on the basis of the foregoing embodiments, the rewriting preset bits of a current target address of the current indirect branch instruction to be same as the preset bits of the legal target addresses, so that the program to be protected terminates when the current target address is tampered with includes:

rewriting the preset bits of the current target address to be same as a label of the current indirect branch instruction, so that the current indirect branch cannot jump to the legal target addresses when the current target address is tampered with, and the program to be protected terminates.

Specifically, in order to make the indirect branch instruction normally jump to the current target address during execution, the preset bits of the current target address can be rewritten to be same as the label of the current indirect branch instruction, and if the program is attacked at this time, and the current target address is tampered with, that is, the target instruction is wrong, after the preset bits are modified to be the same as the label, the current indirect branch does not jump to the legal target addresses, that is, the jump address is not endbr, and the program thus can take that as an attack occurring, automatically trigger an abnormality and terminate. Thus protection of the program is achieved.

The label is preset bits of a legal target address of the current indirect branch instruction.

Specifically, in this embodiment, by using the preset bits of the legal target addresses of the indirect branch as the label, an operation of inserting a label before a jump target in the fine-grained CFI technology can be omitted, and the check efficiency is greatly improved.

Optionally, on the basis of the above-mentioned embodiments, the rewriting the preset bits of the current target address to be same as a label of the current indirect branch instruction specifically includes:

performing an operation of instrumenting code at the current indirect branch instruction.

Specifically, the implementation of rewriting the preset bits of the current target address to be the same as the label of the current indirect branch instruction can utilize a way of code instrumentation.

The code is used to rewrite the preset bits of the current target address to be same as the label.

Specifically, during the code instrumentation operation, two lines of codes can be inserted for rewriting the preset bits of the current target address to be the same as the label. For example, if the label is 0xAB and the preset bits are low bits, AND ecx, 0xFFFFFF00; XOR ecx, 0xFFFFFFAB can be directly inserted, and these two instructions can rewrite the preset bits of the current target address to be consistent with the label which both are 0xAB. That is, the preset bits of jmp ecx that stores the jump target are directly rewritten to be 0xAB, corresponding to the label.

Optionally, on the basis of the above-mentioned embodiments, the changing preset bits of all legal target addresses of a current indirect branch instruction in a control flow of a program to be protected, to make the preset bits of any legal target address of the current indirect branch instruction be same as the preset bits of other legal target addresses of the current indirect branch instruction, specifically includes:

performing a null instruction filling operation on all the legal target addresses respectively, so that the preset bits of all the legal target addresses increase until equal to the label of the current indirect branch instruction.

Specifically, FIG. 5 is a flowchart of a null instruction filling operation of a legal target address provided by an embodiment of the present disclosure. As shown in FIG. 5, X represents an arbitrary address, code is an original instruction of the program, endbr is a mark, and padding is a null instruction filled in this embodiment. For example, if preset bits are low bits of an address, it can be assumed that low bits of an original legal target address are f0 and the label is f4, therefore, filling four null instructions in front can change the low bits of the legal target address to be f4. It is understandable that specific rules are adopted in actual applications to avoid adding padding too long.

Optionally, on the basis of the above-mentioned embodiments, the label of the current indirect branch instruction is randomly preset, where the label of the current indirect branch instruction is different from labels of other indirect branch instructions in the program to be protected.

Specifically, the label is the preset bits of the legal target address of the current indirect branch instruction. When the preset bits of the legal target address is specifically set, it is possible to set them randomly, where it is only necessary to keep the label of the current indirect branch instruction different from the labels of other indirect branch instructions in the program to be protected, to avoid a situation that duplication occurs at a time when the jump target address is rewritten which leads to jump errors.

It is understandable that when the label of the current indirect branch instruction is randomly set, a size of the label can be set to be slightly larger than that of preset bits of all original legal target addresses, and can also be as close as possible to that of the preset bits of all the original legal target addresses, to avoid inserting too many null instructions when the null instruction filling operation is performed on all legal target addresses respectively, which affects the efficiency of program execution.

Optionally, on the basis of the above-mentioned embodiments, the preset bits of the legal target addresses are low bytes of the legal target addresses, and the preset bits of the current target address are low bytes of the current target address.

Specifically, in order to make the preset bits of all the legal target addresses increase regularly when the null instruction filling operation is performed on all the legal target addresses respectively and make it easier to achieve, the preset bits of the legal target addresses may be the low bytes of the legal target addresses. Therefore, when the null instruction filling operation is performed on all the legal target addresses respectively, for each filling operation, low bits of a legal target address are incremented by one, which enables an easier determination of whether the preset bits of the legal target address increases enough to be equal to the label of the current indirect branch instruction.

It is understandable that, in the embodiment, all low bits of addresses refer to low bytes of the addresses.

Optionally, on the basis of the above-mentioned embodiments, before the rearranging all legal target addresses of indirect branch instructions in the control flow of the program to be protected, the method further includes:

performing static analysis on the program to be protected to obtain the control flow of the program to be protected.

Specifically, static analysis of program code is to infer behavior information of the program during running by checking source code of the program. Static analysis not only can check errors and security vulnerabilities in a specified program, but also can add ideas of the static analysis to a code compiler for program optimization. A most critical technical point for applying the static analysis to optimization is flow analysis technology which includes control-flow analysis.

A control flow graph (CFG) is also called a control flow chart, which is an abstract representation of a process or a program, is an abstract data structure used in a compiler, and is maintained internally by the compiler and represents all paths that are traversed in a program execution process. The control flow graph expresses, in the form of a graph, possible flows of execution of all basic blocks in a process, and can also reflect a real-time execution process of a process. Each node in the control-flow graph represents a basic block, and a jump target starts with a block and ends with a block.

In the embodiment, if the program is to be protected by replacing the traditional label with the low bit coverage operation, a first need is to obtain all legal paths, that is, to perform the static analysis to obtain a control flow of the program to be protected.

In the method for control-flow integrity protection provided by the embodiments of the present disclosure, by changing the preset bits of all the legal target addresses of the current indirect branch instruction to be same and rewriting the preset bits of the current target address of the current indirect branch instruction to be consistent with the preset bits of the legal target addresses, traditional label comparison is replaced by the preset bit coverage operation, which reduces the performance overhead and improves the attack defense efficiency. In addition, the program to be protected is enabled to terminate when the current target address is tampered with, as an error in a target instruction triggers an abnormality, which realizes a fine-grained control-flow integrity protection, and improves the security and reliability of control-flow integrity protection.

Figure 6:
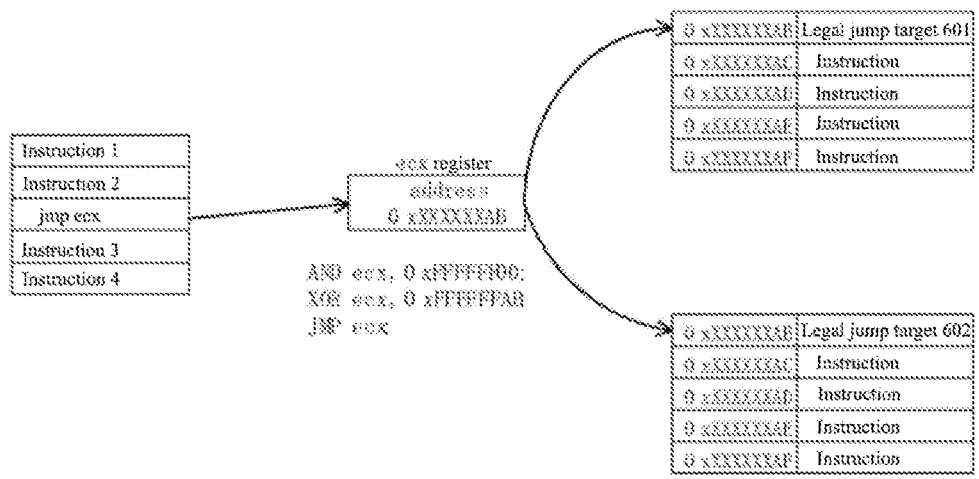
FIG. 6 is a schematic diagram of a principle of a method for control-flow integrity protection provided by an embodiment of the present disclosure.

FIG. 6 is a schematic diagram of a principle of a method for control-flow integrity protection provided by an embodiment of the present disclosure. As shown in FIG. 6, first an existing static analysis tool can be used to obtain the control flow graph of the program to be protected, and then to obtain a jmp ecx instruction with two legal jump targets. That is, legal jump targets 601 and 602. In this embodiment, preset bits of all possible legal target addresses of the jmp ecx instruction can be kept consistent. That is, preset bits of addresses of the legal jump target 601 and the legal jump target 602 are changed to be consistent. Therefore an address rearrangement operation is performed on the legal jump target 601 and the legal jump target 602. Specifically, the null instruction filling operation is performed on the legal jump target 601 and the legal jump target 602 respectively, so that the preset bits of the legal jump target 601 and the legal jump target 602 increase. It is understandable that an amount of filled and inserted null instructions can be random, as long as the preset bits of the addresses of the legal jump target 601 and the legal jump target 602 are kept consistent.

In this implementation, the low bits of the legal target address can be used as the preset bits, and the low bits of the legal target address are also used as the label. After the legal target address is rearranged, the low bits of the addresses of the legal jump targets 601 and 602 are both 0xAB, that is, with 0xAB used as the label. With code inserted at jmp ecx, compared with the comparison operation in traditional CFI, the embodiment uses a way of low bit coverage to directly insert two instructions of AND ecx, 0xFFFFFF00; XOR ecx, 0xFFFFFFAB; and directly rewrite the low bits of the current target address stored in ecx to be 0xAB, which correspond to the label. If the program is executed normally, there is no any impact. If the destination address in ecx is tampered with by an attacker, the low bits of the tampered address by the attacker are also rewritten to 0xAB, and so a jump to a jump target to which the attacker wants to construct the attack is impossible, and the program also terminate as an error in a target instruction automatically triggers an abnormality.

Figure 7:
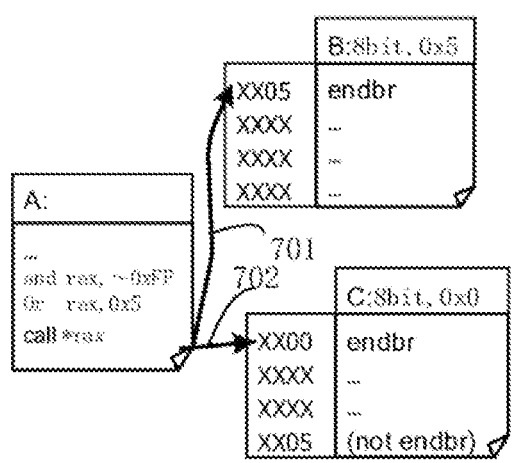
FIG. 7 is a schematic diagram of a principle of a method for control-flow integrity protection provided by another embodiment of the present disclosure.

FIG. 7 is a schematic diagram of a principle of a method for control-flow integrity protection provided by another embodiment of the present disclosure. As shown in FIG. 7, a legal jump path of a control flow graph in FIG. 7 is path 701: A to B. Preset bits can be assumed to be low bits, and so low bits of an address of B can be changed to be 0x5. At this time, a current jump address of A also needs to be rewritten to be 0x5, so that a jump from A to B can be realized. It is understandable that in this embodiment, because a path 702: A to C is not a legal path, low bits of a legal target address of A can be required to be inconsistent with low bits of an address of C in order to prevent a jump from A to C, and as shown in FIG. 7, the low bits of the address of C is 0x0.

Figure 8:
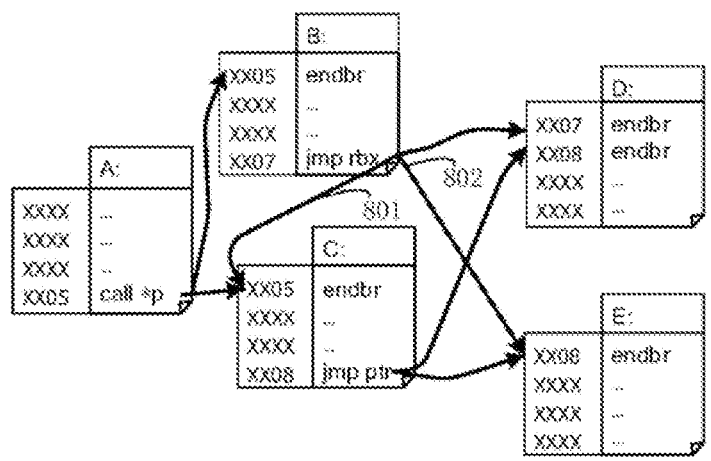
FIG. 8 is a schematic diagram of effects of a method for control-flow integrity protection provided by an embodiment of the present disclosure.

FIG. 8 is a schematic diagram of effects of a method for control-flow integrity protection provided by an embodiment of the present disclosure. As shown in FIG. 8, low bits of a legal target address of B can be changed to 0x07. That is, 0x07 is directly used as the label. Therefore, there is no limitation of only one bit for set. The low bits of the legal target address of B, that is, lower bits of an address of D, can be changed to be 0x07. Therefore, when the program is executed, since a current target address of B is also rewritten to be consistent with the label, which is 0x07, a direct jump to D is possible during a jump process.

If the program is attacked, the current target address of B is tampered with, and for example, becomes an address in C. That is, the current target address of B is tampered with to be a jump path 801. It is understandable that after the target address of B is tampered with, low bits of the current target address are rewritten to be 0x07 when a jump is performed. That is, low bits of an address of the jump path 801 resulting from the tampering by the attacker are rewritten to be 0x07. However, C itself does not belong to a legal path from B. When the legal target addresses are rearranged, low bits of an address of C are not changed to be consistent with low bits (i.e. 0x07) of a legal target address of B, but remains with an original address unchanged. That is, the address of C is inconsistent with the current target address of B of which the low bits are rewritten to be 0x07, so the jump path 801 is abnormal, and that is, a jump from B cannot be conducted according to the path 801 desired by the attacker, that is, a jump to C is impossible. It is understandable that a role of endbr in the program is to verify that a target address is a desired jump target.

If the program is attacked, the current target address of B is tampered with, and for example, becomes an address in D. That is, the current target address of B is tampered with to be a jump path 802. It is understandable that after the target address of B is tampered with, low bits of the current target address are rewritten to be 0x07 when a jump is performed. That is, low bits of an address of the jump path 802 resulting from the tampering by the attacker are rewritten to be 0x07. However, D itself does not belong to a legal path from B. When the legal target addresses are rearranged, low bits of an address of D are not changed to be consistent with low bits (i.e. 0x07) of a legal target address of B, but remains with an original address unchanged. That is, the address of D is inconsistent with the current target address of B of which the low bits are rewritten to be 0x07, so the jump path 802 is abnormal, and that is, a jump from B cannot be conducted according to the path 802 desired by the attacker, that is, a jump to D is impossible. It is understandable that the method for control-flow integrity protection in this embodiment can defend against all attacks.

Figure 9:
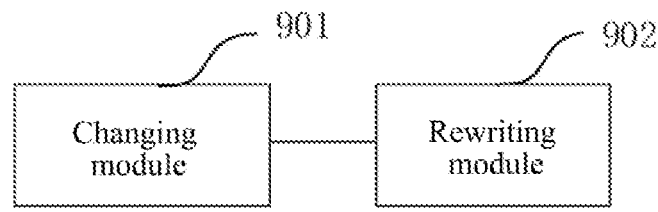
FIG. 9 is an apparatus for control-flow integrity protection provided by an embodiment of the present disclosure.

FIG. 9 is an apparatus for control-flow integrity protection provided by an embodiment of the present disclosure, which includes: a changing module 901 and a rewriting module 902.

The changing module 901 is configured to change preset bits of all legal target addresses of a current indirect branch instruction in a control flow of a program to be protected, to make the preset bits of any legal target address of the current indirect branch instruction be same as the preset bits of other legal target addresses of the current indirect branch instruction; and the rewriting module 902 is configured to rewrite preset bits of a current target address of the current indirect branch instruction to be same as the preset bits of the legal target addresses, so that the program to be protected terminates when the current target address is tampered with.

Specifically, in the apparatus for control-flow integrity protection, the preset bits of all the legal target addresses of the current indirect branch instruction in the control flow of the program to be protected are changed to be the same through the changing module 901; and the preset bits of the current target address of the current indirect branch instruction are rewritten to be consistent with the preset bits of the legal target addresses through the rewriting module 902, so that the program to be protected can terminate when the current target address is tampered with, due to a target instruction error.

In the apparatus for control-flow integrity protection provided by the embodiments of the present disclosure, by changing the preset bits of all the legal target addresses of the current indirect branch instruction to be same and rewriting the preset bits of the current target address of the current indirect branch instruction to be consistent with the preset bits of the legal target addresses, traditional label comparison is replaced by the preset bit coverage operation, which reduces the performance overhead and improves the attack defense efficiency. In addition, the program to be protected is enabled to terminate when the current target address is tampered with, as an error in a target instruction triggers an abnormality, which realizes a fine-grained control-flow integrity protection, and improves the security and reliability of control-flow integrity protection.

Figure 10:
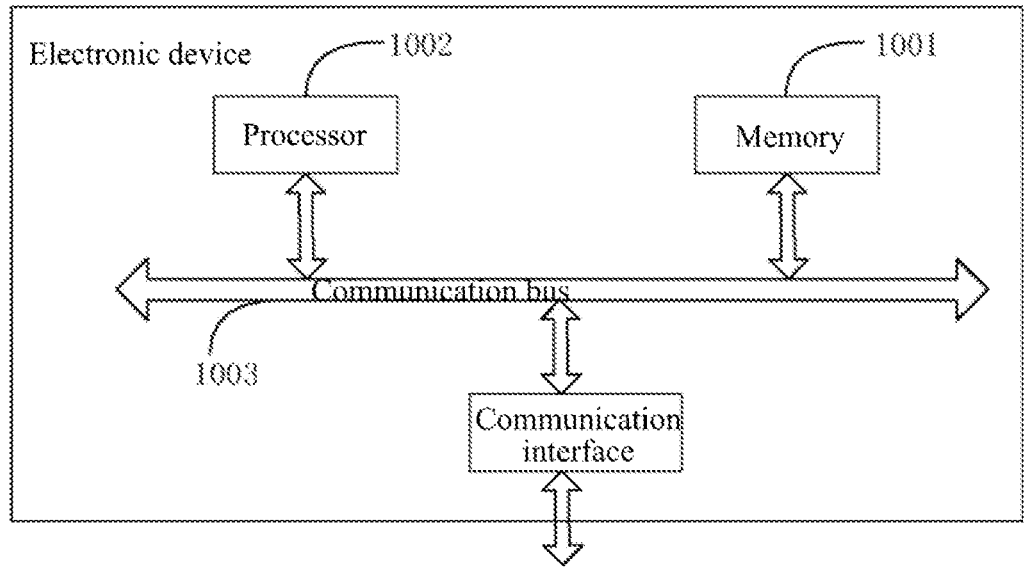
FIG. 10 is a schematic diagram of composition of an electronic device provided by an embodiment of the present disclosure.

FIG. 10 is a schematic diagram of composition of an electronic device provided by an embodiment of the present disclosure. As shown in FIG. 10, the electronic device includes a memory 1001, a processor 1002, and a program which is stored on the memory 1001 and capable of running on the processor 1002, where the memory 1001 and the processor 1002 communicate with each other through a communication bus 1003, and the processor 1002 implements the following steps when executing the program:

changing preset bits of all legal target addresses of a current indirect branch instruction in a control flow of a program to be protected, to make the preset bits of any legal target address of the current indirect branch instruction be same as the preset bits of other legal target addresses of the current indirect branch instruction: and rewriting preset bits of a current target address of the current indirect branch instruction to be same as the preset bits of the legal target addresses, so that the program to be protected terminates when the current target address is tampered with.

In addition, the above-mentioned computer program in the memory 1001 may be implemented in the form of a software functional unit and may be stored in a computer readable storage medium when sold or used as an independent product. Based on such understanding, the technical solution of the present disclosure essentially or the part that contributes to the prior art or the part of the technical solution can be embodied in the form of a software product, and the computer software product is stored in a storage medium, including several instructions causing a computer device (which may be a personal computer, a server, or a network device, etc.) to execute all or part of the steps of the method described in the various embodiments of the present disclosure. The foregoing storage media include: a U disk, a mobile hard disk, a read-only memory (ROM), a random access memory (RAM), a magnetic disk or an optical disk and other media that can store program codes.

The processor 1002 executes the process of the method involved in the program. A specific reference can be made to the above-mentioned method embodiments, which will not be repeated here.

An embodiment of the present disclosure also provides a non-transitory computer-readable storage medium on which a computer program is stored. When the computer program is executed by a processor, procedures for performing the method for control-flow integrity protection provided by the above-mentioned embodiments are implemented. Reference for specific functions and processes can be made to the above-mentioned method embodiments for details, which will not be repeated here.

The apparatus embodiments described above are merely illustrative, where the units described as separate components may be or may not be physically separated, and the components displayed as units may be or may not be physical units, that is, may be located in one place, or may be distributed to multiple network units. Some or all of the modules can be selected according to actual needs to achieve the purposes of the solutions of the embodiments, which those of ordinary skill in the art can understand and implement without creative work.

Through the description of the above-mentioned implementations, those skilled in the art can clearly understand that each implementation can be implemented in a form of software plus a necessary general hardware platform, and of course, can also be implemented by hardware. Based on such understanding, the above-mentioned technical solution essentially or the part that contributes to the prior art can be embodied in the form of a software product, and the computer software product can be stored in a computer-readable storage medium, such as a ROM/RAM, a magnetic disc, an optical disc, etc., including a number of instructions to cause a computer device (which may be a personal computer, a server, or a network device, etc.) to execute the methods described in each embodiment or some parts of the embodiments.

Finally, it should be noted that the above-mentioned embodiments are only used to illustrate but not to limit the technical solutions of the present disclosure; although the present disclosure has been described in detail with reference to the foregoing embodiments, those of ordinary skill in the art should understand that: the technical solutions recorded in the foregoing embodiments can still be modified, or some of the technical features thereof can be equivalently replaced; these modifications or replacements do not cause the essence of the corresponding technical solutions to deviate from the spirit and the scope of the technical solutions of the embodiments of the present disclosure.

What is claimed is:

1. A method for control-flow integrity protection, comprising:

changing preset bits of all legal target addresses of a current indirect branch instruction in a control flow of a program to be protected, to make the preset bits of any legal target address of the current indirect branch instruction be same as the preset bits of other legal target addresses of the current indirect branch instruction; and rewriting preset bits of a current target address of the current indirect branch instruction to be same as a label of the current indirect branch instruction, so that a current indirect branch cannot jump to the legal target addresses and the program to be protected terminates, when the current target address is tampered with; wherein the label is the changed preset bits of the legal target addresses of the current indirect branch instruction, and wherein the changing preset bits of all legal target addresses of a current indirect branch instruction in a control flow of a program to be protected, to make the preset bits of any legal target address of the current indirect branch instruction be same as the preset bits of other legal target addresses of the current indirect branch instruction, comprises:

performing a null instruction fitting operation on each of the legal target addresses, so that the preset bits of each of the legal target addresses increase, until the preset bits of each of the legal target addresses are equal to the label of the current indirect branch instruction, wherein the label of the current indirect branch instruction is preset at random, and the label of the current indirect branch instruction is different from labels of other indirect branch instructions in the program to be protected.

2. The method for control-flow integrity protection according to claim 1, wherein the rewriting the preset bits of the current target address to be same as a label of the current indirect branch instruction specifically, further comprises:

performing an operation of instrumenting code at the current indirect branch instruction;

wherein the instrumented code is used to rewrite the preset bits of the current target address to be same as the label.

3. The method for control-flow integrity protection according to claim 1, wherein the preset bits of the legal target addresses are low bytes of the legal target addresses, and the preset bits of the current target address are low bytes of the current target address.

4. The method for control-flow integrity protection according to claim 1, wherein before changing the preset bits of all legal target addresses of the current indirect branch instruction in the control flow of the program to be protected, the method further comprises:

performing static analysis on the program to be protected to obtain the control flow of the program to be protected.

5. An apparatus for control-flow integrity protection, comprising: a memory and a processor, wherein the memory stores a computer program which, when executed by the processor, causes the processor to:
- change preset bits of all legal target addresses of a current indirect branch instruction in a control flow of a program to be protected, to make the preset bits of any legal target address of the current indirect branch instruction be same as the preset bits of other legal target addresses of the current indirect branch instruction; and
- rewrite preset bits of a current target address of the current indirect branch instruction to be same as a label of the current indirect branch instruction, so that a current indirect branch cannot jump to the legal target addresses and the program to be protected terminates, when the current target address is tampered with; wherein the label is the changed preset bits of the legal target addresses of the current indirect branch instruction, and
- the computer program further causes the processor to: perform a null instruction filling operation on each of the legal target addresses, so that the preset bits of each of the legal target addresses increase, until the preset bits of each of the legal target addresses are equal to the label of the current indirect branch instruction, wherein the label of the current indirect branch instruction is preset at random, and the label of the current indirect branch instruction is different from labels of other indirect branch instructions in the program to be protected.

6. The apparatus according to claim 5, wherein the computer program further causes the processor to:
- perform an operation of instrumenting code at the current indirect branch instruction, wherein the instrumented code is used to rewrite the preset bits of the current target address to be same as the label.

7. The apparatus according to claim 5, wherein the preset bits of the legal target addresses are low bytes of the legal target addresses, and the preset bits of the current target address are low bytes of the current target address.

8. The apparatus according to claim 5, wherein the computer program further causes the processor to:
- perform static analysis on the program to be protected to obtain the control flow of the program to be protected, before changing the preset bits of all legal target addresses of the current indirect branch instruction in the control flow of the program to be protected.

9. A non-transitory computer-readable storage medium on which a computer program is stored, wherein the computer program, when executed by a processor, causes the processor to:
- change preset bits of all legal target addresses of a current indirect branch instruction in a control flow of a program to be protected, to make the preset bits of any legal target address of the current indirect branch instruction be same as the preset bits of other legal target addresses of the current indirect branch instruction; and
- rewrite preset bits of a current target address of the current indirect branch instruction to be same as a label of the current indirect branch instruction, so that a current indirect branch cannot jump to the legal target addresses and the program to be protected terminates, when the current target address is tampered with; wherein the label is the changed preset bits of the legal target addresses of the current indirect branch instruction, and
- the computer program further causes the processor to: perform a null instruction filling operation on each of the legal target addresses, so that the preset bits of each of the legal target addresses increase, until the preset bits of each of the legal target addresses are equal to the label of the current indirect branch instruction, wherein the label of the current indirect branch instruction is preset at random, and the label of the current indirect branch instruction is different from labels of other indirect branch instructions in the program to be protected.

10. The non-transitory computer-readable storage medium according to claim 9, wherein the computer program further causes the processor to: perform an operation of instrumenting code at the current indirect branch instruction, wherein the instrumented code is used to rewrite the preset bits of the current target address to be same as the label.

11. The non-transitory computer-readable storage medium according to claim 9, wherein the preset bits of the legal target addresses are low bytes of the legal target addresses, and the preset bits of the current target address are low bytes of the current target address.

* * * * *

UNITED STATES PATENT AND TRADEMARK OFFICE
CERTIFICATE OF CORRECTION

| | | |
|---|---|---|
| PATENT NO. | : 11,704,404 B2 | Page 1 of 1 |
| APPLICATION NO. | : 17/361270 | |
| DATED | : July 18, 2023 | |
| INVENTOR(S) | : Dan Meng et al. | |

It is certified that error appears in the above-identified patent and that said Letters Patent is hereby corrected as shown below:

On the Title Page

After "item (22) Filed: June 28, 2021" insert:
-- (30) Foreign Application Priority Data
June 28, 2020 (CN) .............................. 202010599864.5 --.

Signed and Sealed this
Second Day of April, 2024

Katherine Kelly Vidal
*Director of the United States Patent and Trademark Office*